United States Patent
Fleischman

(10) Patent No.: US 11,381,856 B2
(45) Date of Patent: Jul. 5, 2022

(54) SOCIAL NETWORKING SYSTEM TARGETED MESSAGE SYNCHRONIZATION

(71) Applicant: BlueFin Labs, Inc., Cambridge, MA (US)

(72) Inventor: Michael Ben Fleischman, Somerville, MA (US)

(73) Assignee: Bluefin Labs, Inc., Cambridge, MA (US)

(*) Notice: Subject to any disclaimer, the term of this patent is extended or adjusted under 35 U.S.C. 154(b) by 0 days.

(21) Appl. No.: 16/908,001

(22) Filed: Jun. 22, 2020

(65) Prior Publication Data

US 2021/0044847 A1    Feb. 11, 2021

Related U.S. Application Data

(63) Continuation of application No. 15/589,926, filed on May 8, 2017, now Pat. No. 10,694,233, which is a
(Continued)

(51) Int. Cl.
*H04N 21/24* (2011.01)
*G06Q 50/00* (2012.01)
(Continued)

(52) U.S. Cl.
CPC ......... *H04N 21/2407* (2013.01); *G06Q 30/02* (2013.01); *G06Q 50/01* (2013.01);
(Continued)

(58) Field of Classification Search
CPC .. G06Q 30/02; G06Q 50/01; H04N 21/23418; H04N 21/2407; H04N 21/2668;
(Continued)

(56) References Cited

U.S. PATENT DOCUMENTS

| 7,519,658 B1 | 4/2009 | Anglin et al. |
| 8,516,374 B2 | 8/2013 | Fleischman et al. |

(Continued)

OTHER PUBLICATIONS

Bouthemy et al., "A Unified Approach to Shot Change Detection and Camera Motion Characterization," IEEE Transactions on Circuits and Systems for Video Technology, Oct. 1999, 9(7):1030-1044.

(Continued)

*Primary Examiner* — Farzana Hossain
(74) *Attorney, Agent, or Firm* — Fish & Richardson P.C.

(57) ABSTRACT

Targeted messages are sent to users of social networking system (SNS) based on the detection of airings of advertisements in time-based media. This approach allows advertisers to leverage their investment in, for example, television advertising by sending advertisements to SNS users who have likely seen the advertisements within shows that they have expressed interest in in the context of a SNS. Time-based media streams are analyzed to detect the airings of advertisements within those streams. In one embodiment, SNS content items are received regarding individual users. Based on references in those content items between users and their interests, targeted messages may be sent to users. In another embodiment, targeted messages are sent to SNS users based on the airing of advertisements and targeting criteria provided by advertisers.

18 Claims, 8 Drawing Sheets

Related U.S. Application Data continuation of application No. 13/431,925, filed on Mar. 27, 2012, now abandoned.

(51) Int. Cl.

| | | |
|---|---|---|
| *H04N 5/14* | (2006.01) | |
| *H04N 21/234* | (2011.01) | |
| *H04N 21/2668* | (2011.01) | |
| *H04N 21/4788* | (2011.01) | |
| *H04N 21/81* | (2011.01) | |
| *H04N 21/8405* | (2011.01) | |
| *H04N 21/845* | (2011.01) | |
| *G06Q 30/02* | (2012.01) | |

(52) U.S. Cl.
CPC ....... *H04N 5/147* (2013.01); *H04N 21/23418* (2013.01); *H04N 21/2668* (2013.01); *H04N 21/4788* (2013.01); *H04N 21/812* (2013.01); *H04N 21/8405* (2013.01); *H04N 21/8456* (2013.01)

(58) Field of Classification Search
CPC ............. H04N 21/4788; H04N 21/812; H04N 21/8405; H04N 21/8456; H04N 5/147
See application file for complete search history.

(56) References Cited

U.S. PATENT DOCUMENTS

| | | | |
|---|---|---|---|
| 8,543,454 | B2 | 9/2013 | Fleischman et al. |
| 8,566,866 | B1 | 10/2013 | Fleischman |
| 8,819,728 | B2 | 8/2014 | Fleischman |
| 8,898,698 | B2 | 11/2014 | Fleischman et al. |
| 9,092,829 | B2 | 7/2015 | Fleischman et al. |
| 9,218,101 | B2 | 12/2015 | Fleischman et al. |
| 9,432,721 | B2 | 8/2016 | Fleischman et al. |
| 2010/0162312 | A1 | 6/2010 | Heilbron et al. |
| 2010/0251279 | A1 | 9/2010 | Piard et al. |
| 2010/0306805 | A1 | 12/2010 | Neumeier et al. |
| 2010/0319043 | A1 | 12/2010 | Jain et al. |
| 2011/0040760 | A1 | 2/2011 | Fleischman et al. |
| 2011/0041080 | A1 | 2/2011 | Fleischman et al. |
| 2012/0167132 | A1 | 6/2012 | Mathews et al. |
| 2012/0271706 | A1* | 10/2012 | Ransom ................. H04L 51/32 |
| | | | 705/14.36 |
| 2013/0014136 | A1 | 1/2013 | Bhatia et al. |
| 2013/0019262 | A1 | 1/2013 | Bhatia et al. |
| 2013/0085859 | A1* | 4/2013 | Sim ....................... G06Q 30/02 |
| | | | 705/14.58 |
| 2013/0263166 | A1 | 10/2013 | Fleischman |
| 2015/0052543 | A1 | 2/2015 | Fleischman et al. |
| 2017/0311014 | A1 | 10/2017 | Fleischman |

OTHER PUBLICATIONS

Hauptmann et al., "Story Segmentation and Detection of Commercials in Broadcast News Video," Proceedings IEEE International Forum on Research and Technology Advances in Digital Libraries—ADL'98—, Apr. 1998, 12 pages.

Jacobs et al., "Automatic Shot Boundary Detection Combining Color, Edge, and Motion Features of Adjacent Frames," Center for Computing Technologies, Nov. 2004, 10 pages.

Tardini et al., "Shot Detection and Motion Analysis for Automatic MPEG-7 Annotation of Sports Videos," 13th International Conference on Image Analysis and Processing, Nov. 2005, 8 pages.

United States Office Action, U.S. Appl. No. 13/431,925, dated Jul. 13, 2015, 22 pages.

United States Office Action, U.S. Appl. No. 13/431,925, dated Mar. 25, 2016, 15 pages.

United States Office Action, U.S. Appl. No. 13/431,925, dated Mar. 5, 2013, 13 pages.

United States Office Action, U.S. Appl. No. 13/431,925, dated Nov. 8, 2016, 18 pages.

United States Office Action, U.S. Appl. No. 13/431,925, dated Nov. 28, 2014, 21 pages.

United States Office Action, U.S. Appl. No. 13/431,925, dated Oct. 11, 2013, 18 pages.

Witten et al., "Data Mining: Practical Machine Learning Tools and Techniques (2nd Edition)", The Morgan Kaufmann Series in Data Management Systems, Jun. 2005, 558 pages.

* cited by examiner

SOCIAL NETWORKING SYSTEM TARGETED MESSAGE SYNCHRONIZATION

CROSS REFERENCE TO RELATED APPLICATIONS

This application is a continuation of U.S. application Ser. No. 15/589,926 filed May 8, 2017, now allowed, which is a continuation of U.S. application Ser. No. 13/431,925, filed Mar. 27, 2012, now abandoned, which is incorporated by reference in its entirety.

FIELD OF THE INVENTION

The present invention relates generally to correlating advertisements with video content and using those correlations to send targeted advertisements to social networking system users.

BACKGROUND OF THE INVENTION

Online social media services, such as social networking sites, search engines, news aggregators, blogs, and the like provide a rich environment for users to comment on events of interest and communicate with other users. Social media content items authored by users of social networking systems often include references to events that appear in time based media such as television shows, news reports, sporting events, movies, concert performances, and the like. However, although the content items can sometimes refer to the time-based media, the social media content items themselves typically are isolated from the events and time-based media that those content items refer to.

SUMMARY OF THE INVENTION

Targeted messages are sent to users of social networking system (SNS) based on the detection of airings of advertisements in time-based media. This approach allows advertisers to leverage their investment in, for example, television advertising by sending advertisements to SNS users who have likely seen the advertisements within shows that they have expressed interest in in the context of a SNS.

In one embodiment, one or more television streams are monitored to detect when and where a specific advertisement for a particular advertiser is shown. Metadata associated with the television shows and ads, for example the show's title, character names, actor names, plot aspects, or the like, is stored. The TV streams are segmented, and using the metadata individual video events are determined. The video events include the airing locations and times of individual TV shows and advertisements, so that it can be determined which advertisements aired during which TV shows.

In one embodiment, social media content items are received from a SNS. The social media content items contain content and one or more references to other content items associated with users of the SNS or with specific TV shows or advertisements. The references between content items identify the TV shows and advertisements that individual SNS users are connected to in the context of the SNS. The references in social media content items and the airings of advertisements within TV shows are used to create mappings between SNS users and the advertisements they are likely to have seen. Mappings may also be used to create populations of users who are likely to have seen a given advertisement or TV show. The users making up a population may also be filtered based on one or more of demographic, content, or time criteria. Responsive to a specific advertisement being detected as being aired during a specific TV show, or responsive to a request for a message from the SNS, a message is sent to one or more SNS users based on the mappings.

In another embodiment, the detection of airings of advertisements within television shows are used to send targeted messages to SNS users. The messages may be sent along with targeting criteria specifying which SNS users are designated to receive the sent messages. Messages may be sent to the SNSs at the initiative of the targeted messaging provider, or at the request of the SNS. Although described with respect to television shows particularly, the systems and processes described herein may be used in conjunction with any form of time-based media.

The features and advantages described in this summary and the following detailed description are not all-inclusive. Many additional features and advantages will be apparent to one of ordinary skill in the art in view of the drawings, specification, and claims hereof.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Figure 1:
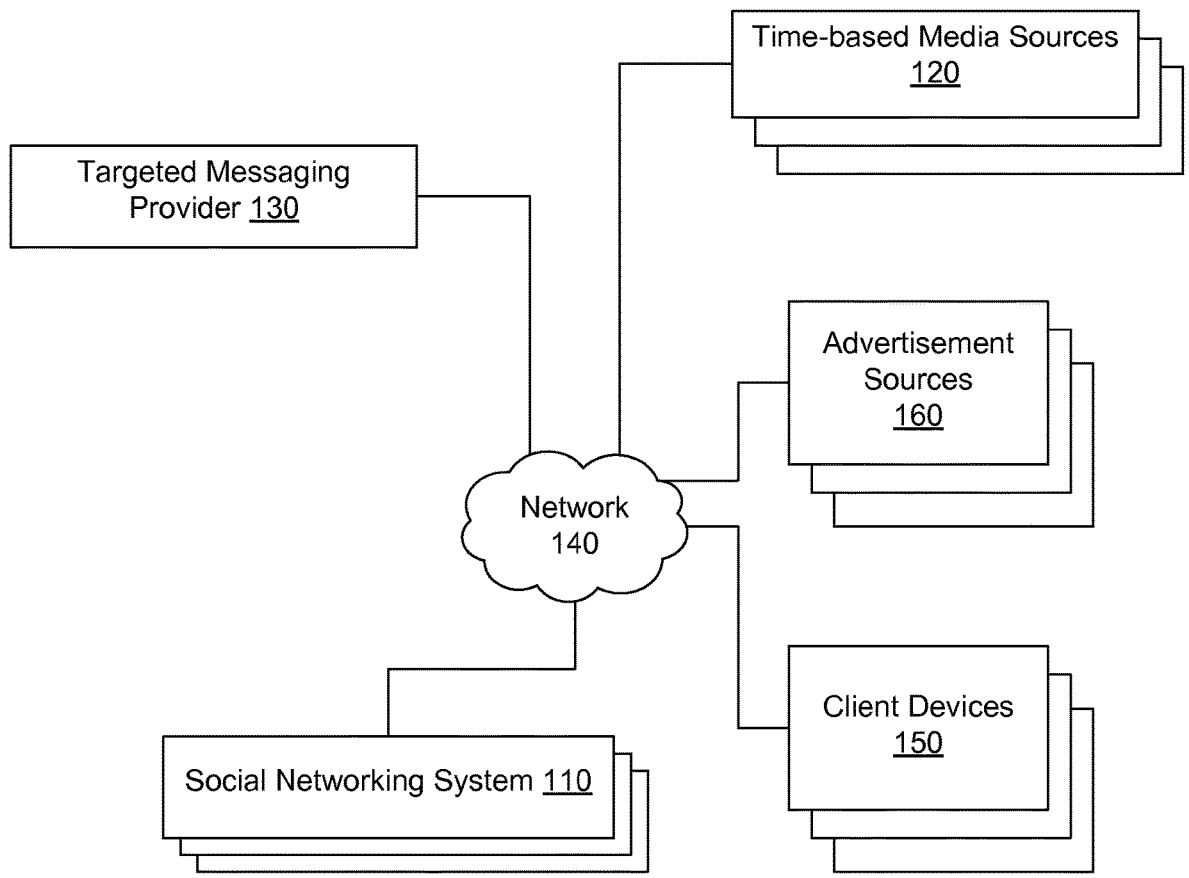
FIG. 1 illustrates the computing environment of one embodiment of a system for associating sending targeted messages to social networking system users.

FIG. 1 illustrates the computing environment 100 of one embodiment of a system 130 for associating sending targeted messages to social networking system users based on associations between advertisements and other time-based media.

The environment 100 includes social networking systems (SNSs) 110, time-based media sources 120, the targeted messaging provider 130, a network 140, client devices 150, and advertisement sources 160.

The SNSs 110 include social networks, blogs, news media, forums, user groups, etc. These systems generally provide a plurality of users with the ability to communicate and interact with other users of the system. Users can typically contribute various social media content items (e.g., posts, videos, photos, links, status updates, blog entries, tweets, profiles, and the like), which may refer to media events (e.g., TV shows, advertisements) or other social media content items (e.g., pages associated with TV shows or advertisements), and can engage in discussions, games, online events, and other participatory services.

The time-based media sources 120 include broadcasters, direct content providers, advertisers, and any other third-party providers of time-based media content. These sources 120 typically publish content such as TV shows, videos, movies, serials, audio recordings, and the like.

The network 140 may comprise any combination of local area and/or wide area networks, the Internet, or one or more intranets, using both wired and wireless communication systems.

The client devices 150 comprise computing devices that can receive input from a user and can transmit and receive data via the network 140. For example, client devices 150 may be a desktop computer, a laptop computer, a smart phone, a personal digital assistant (PDAs), or any other device including computing functionality and data communication capabilities. A client device 150 is configured to communicate with the social networking systems 110 via the network 140.

The advertisement sources 160 include companies, advertising agencies, or any other third-party organizations that create messages (e.g., advertisements, creatives) to be sent to SNS users through the SNS 110. The messages may be published in the SNSs 110 alongside other content, for example in the web page of a browser viewed by a SNS user on a client device 150, however the messages may also be displayed alongside time-based media sources 120 (e.g., TV shows, audio recordings). The messages may be provided to the targeted messaging provider 130 to be sent to the SNS 110 at the discretion of the provider 130. The messages may also be provided directly to SNSs 110, and may be sent to SNS users in response to other messages from the targeted messaging provider 130, The targeted messaging provider 130 provides targeted advertisements to users of social networking systems based information received from the time-based media sources 120 and the SNSs 110, and is further described in conjunction with FIGS. 2-7.

Figure 2:
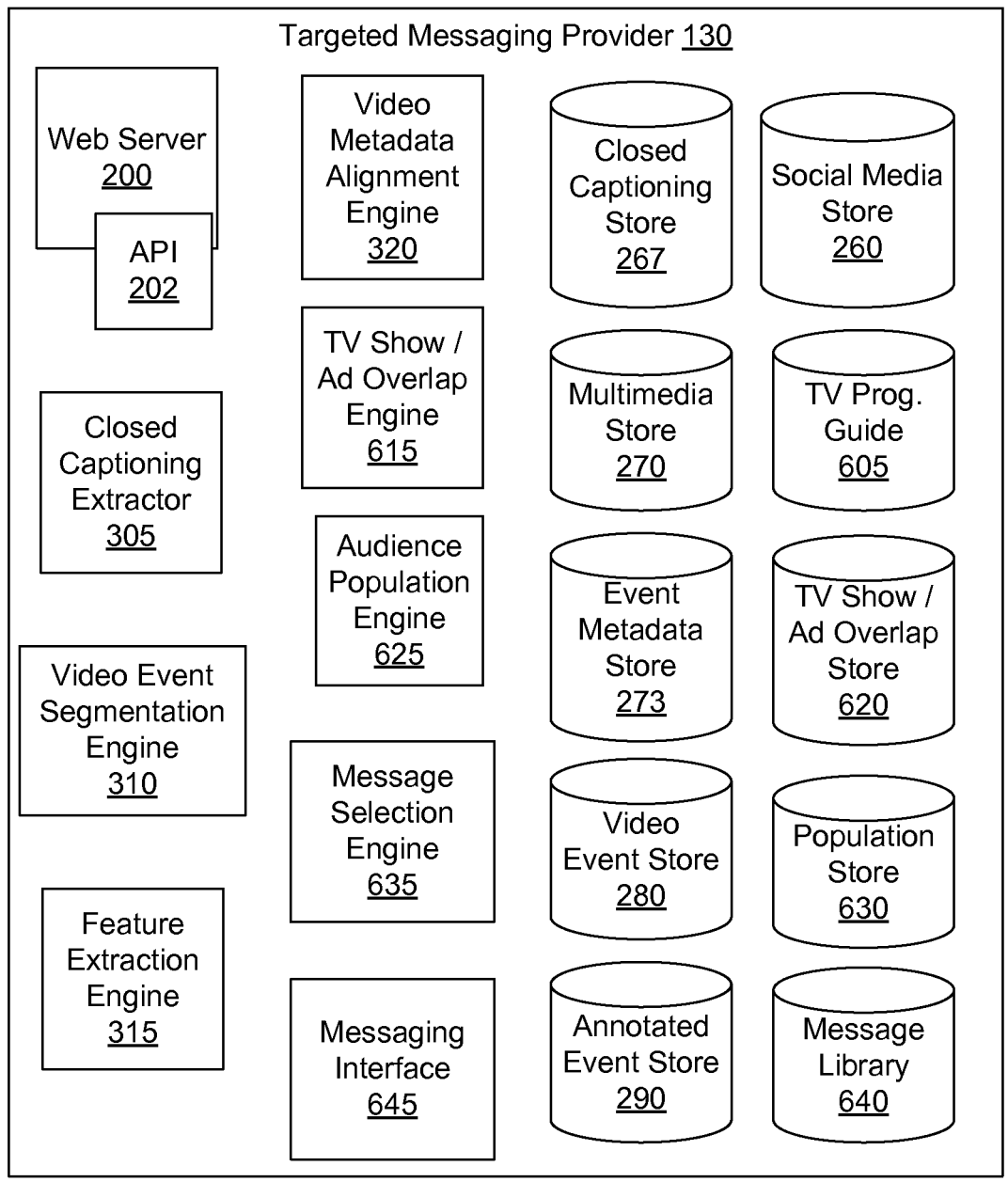
FIG. 2 is a block diagram of one embodiment of a targeted messaging provider.

FIG. 2 is a block diagram of one embodiment of a targeted messaging provider 130. The targeted messaging provider 130 shown in FIG. 2 is a computer system that includes a web server 200 and associated API 202, a closed captioning extractor 305, a video event segmentation engine 310, a feature extraction engine 315, a video metadata alignment engine 320, a TV show/ad overlap engine 615, an audience population engine 625, a message selection engine 635, a messaging interface 645, a closed captioning store 267, a multimedia store 270, an event metadata store 273, a video event store 280, an annotated event store 290, a received social media information store 260, a TV programming guide 605, a TV show/ad overlap engine 620, a population store 630, and a message library 640.

This system may be implemented using a single computer, or a network of computers, including cloud-based computer implementations. The computers are preferably server class computers including one or more high-performance CPUs, 1 G or more of main memory, as well as 500 GB to 2 Tb of computer readable, persistent storage, and running an operating system such as LINUX or variants thereof. The operations of the system 130 as described can be controlled through either hardware or through computer programs installed in computer storage and executed by the processors of such servers to perform the functions described herein. The system 130 includes other hardware elements necessary for the operations described here, including network interfaces and protocols, security systems, input devices for data entry, and output devices for display, printing, or other presentations of data; these and other conventional components are not shown so as to not obscure the relevant details.

As noted above, system 130 comprises a number of "engines," which refers to computational logic for providing the specified functionality. An engine can be implemented in hardware, firmware, and/or software. An engine may sometimes be equivalently referred to as a "module" or a "server." It will be understood that the named components represent one embodiment of the present invention, and other embodiments may include other components. In addition, other embodiments may lack the components described herein and/or distribute the described functionality among the components in a different manner. Additionally, the functionalities attributed to more than one component can be incorporated into a single component. Where the engines described herein are implemented as software, the engine can be implemented as a standalone program, but can also be implemented through other means, for example as part of a larger program, as a plurality of separate programs, or as one or more statically or dynamically linked libraries. In any of these software implementations, the engines are stored on the computer readable persistent storage devices of the system 130, loaded into memory, and executed by the one or more processors of the system's computers. The operations of the system 130 and its various components will be further described below with respect to FIG. 2 and the remaining figures. As will become apparent, the various data processing operations described herein are sufficiently complex and time consuming as to require the operation of a computer system such as the system 130.

The web server 200 links the system 130 to the client devices 150, the time-based media sources 120, and the social networking systems 110 via network 140, and is one means for doing so. The web server 200 serves web pages, as well as other web related content, such as Java, Flash, XML, and so forth. The web server 200 may include a mail server or other messaging functionality for receiving and routing messages between the system 130 and client devices 150.

The API 202, in conjunction with web server 200, allows one or more external entities to access information from the system 130. The web server 200 may also allow external entities to send information to the system 130 calling the API 202. For example, an external entity sends an API request to the system 130 via the network 140 and the web server 200 receives the API request. The web server 200 processes the request by calling an API 202 associated with the API request to generate an appropriate response, which the web server 200 communicates to the external entity via the network 140. The API may be used by a SNS 110 to communicate information and requests to the system 130.

The closed captioning extractor 305 extracts closed captioning data from the time-based media. Closed captioning data typically can be extracted from broadcast video or other sources encoded with closed captions using open source software such as CCExtractor available via SourceForge.net. For time-based media not encoded with closed captioning data, imperfect methods such as automatic speech recognition can be used to capture and convert the audio data into a text stream comparable to closed captioning text. This can be done, for example, using open source software such as Sphinx 3 available via SourceForge.net. Once the closed captioning is ingested, it is preferably aligned to speech in a video. Various alignment methods are known in the art. One such method is described in Hauptmann, A. and Witbrock, M., *Story Segmentation and Detection of Commercials in Broadcast News Video*, ADL-98 Advances in Digital Libraries Conference, Santa Barbara, Calif. (April 1998), which uses dynamic programming to align words in the closed captioning stream to the output of a speech recognizer run over the audio track of the video. The closed captioning information is stored in the closed captioning store 267.

The multimedia store 270 stores various forms of time-based media. Time-based media includes any data that changes meaningfully with respect to time. Examples include, and are not limited to, videos, (e.g., TV shows or portions thereof, movies or portions thereof) audio recordings, MIDI sequences, animations, and combinations thereof. Time-based media can be obtained from a variety of sources, such as local or network stores, as well as directly from capture devices such as cameras, microphones, and live broadcasts. It is anticipated that other types of time-based media within the scope of the invention will be developed in the future (e.g., 3D media, holographic presentations, immersive media, and so forth).

The video event segmentation engine 310 segments time-based media into semantically meaningful segments corresponding to discrete portions or "events" (e.g., advertisement events, television events, etc.) and is one means for doing so. Although described with respect to video, the video event segmentation 310 may also operate on audio media, such as for radio broadcasts. The video event segmentation process includes three main components according to one embodiment: shot boundary detection, event detection, and boundary determination. These components for event segmentation may vary by domain (e.g., video, audio). The output of video event segmentation is a set of segmented video events that is stored in the video event store 280.

The feature extraction engine 315 converts segmented time-based media events retrieved from the video event store 280 into feature vector representations for aligning the events with metadata, and is one means for doing so. The features may include image and audio properties and may vary by domain. Feature types may include, but are not limited to, scale-variant feature transform (SIFT), speeded up robust features (SURF), local energy based shape histogram (LESH), color histogram, and gradient location orientation histogram (GLOH).

The video metadata alignment engine 320 aligns video event segments with semantically meaningful information regarding the advertisement event that the event is about, and is one means for doing so. As with the video event segmentation engine 310, the video metadata alignment may also operate on audio events 320. The video metadata alignment engine 320 uses metadata instances from the event metadata store 273. A metadata instance is the metadata for a single event, i.e., a single piece of metadata. The video metadata alignment engine 320 may also be used to annotate the segments with the metadata, or alternatively a separate annotation engine (not shown) may be used. Metadata instances may include automatic annotations of low level content features, e.g., image or audio features or content features, hand annotations with text descriptions, or both. The metadata may be represented as text descriptions of time-based media events and feature vector representations extracted from examples of events. The annotations are stored in the annotated event store 290.

The social media store 260 stores social media content items received from SNSs 110. In general, SNSs 110 allow their users to publish content items to other members of their network, which may be open and viewable by the public through open application program interfaces. Social media content items include long form and short form items such as posts, videos, photos, links, status updates, blog entries, tweets, and the like. Other examples of social media content items include audio of commentators on, or participants of, another event or topic (e.g., announcers on TV or radio) and text transcriptions thereof (generated manually or automatically), event-related information (e.g., recipes, instructions, scripts, etc.), statistical data (e.g., sports statistics or financial data streams), news articles, and media usage statistics (e.g., user behavior such as viewing, rewind, pausing, etc.).

The TV show/ad overlap engine 615, audience population engine 625, message selection engine 635, messaging interface 645, TV programming guide 605, TV show/ad overlap store 620, population store 630, and message library 640 are described below with respect to FIGS. 6 and 7.

Determining Airings of Time-Based Media Events

Figure 3:
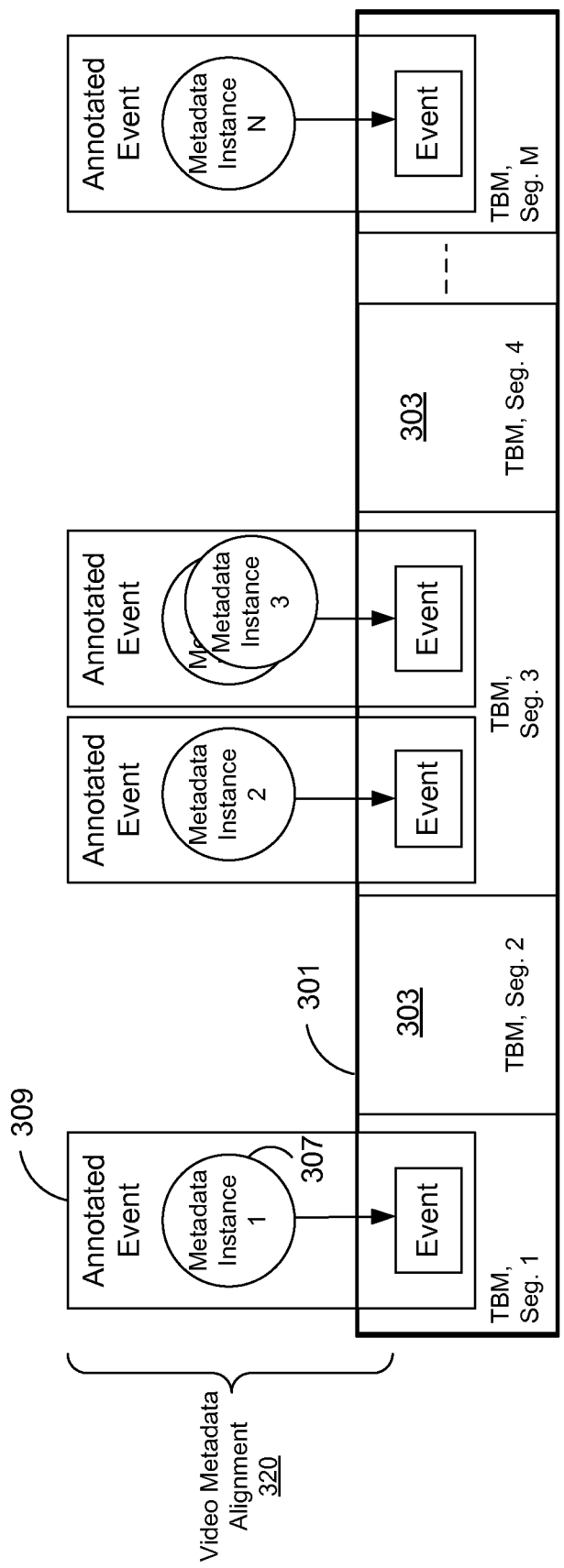
FIG. 3 is a conceptual diagram illustrating the video/metadata alignment process at a high level according to one embodiment.

FIG. 3 is a conceptual diagram illustrating the video metadata alignment 320 process at a high level according to one embodiment. Although this process is described with respect to video events, it can also be used in conjunction with audio events. Beginning with metadata instances 307 and events in time-based media 301 as input, annotated events 309 are formed. As shown, time-based media (TBM) 301 includes multiple segments (seg. 1-M) 303, which contain events in the time-based media, as described herein. The video/metadata alignment 320 process aligns one or more metadata instances (1-N) 307 with the events to form annotated events 309, as further described in conjunction with FIG. 5. Note that in process 320 the various alignments are one-to-one, many-to-one, and/or many-to-many. Once so mapped, the relationships between advertisement media events and non-advertisement media events can be determined to send targeted messaging, as further explained below.

Figure 3A:
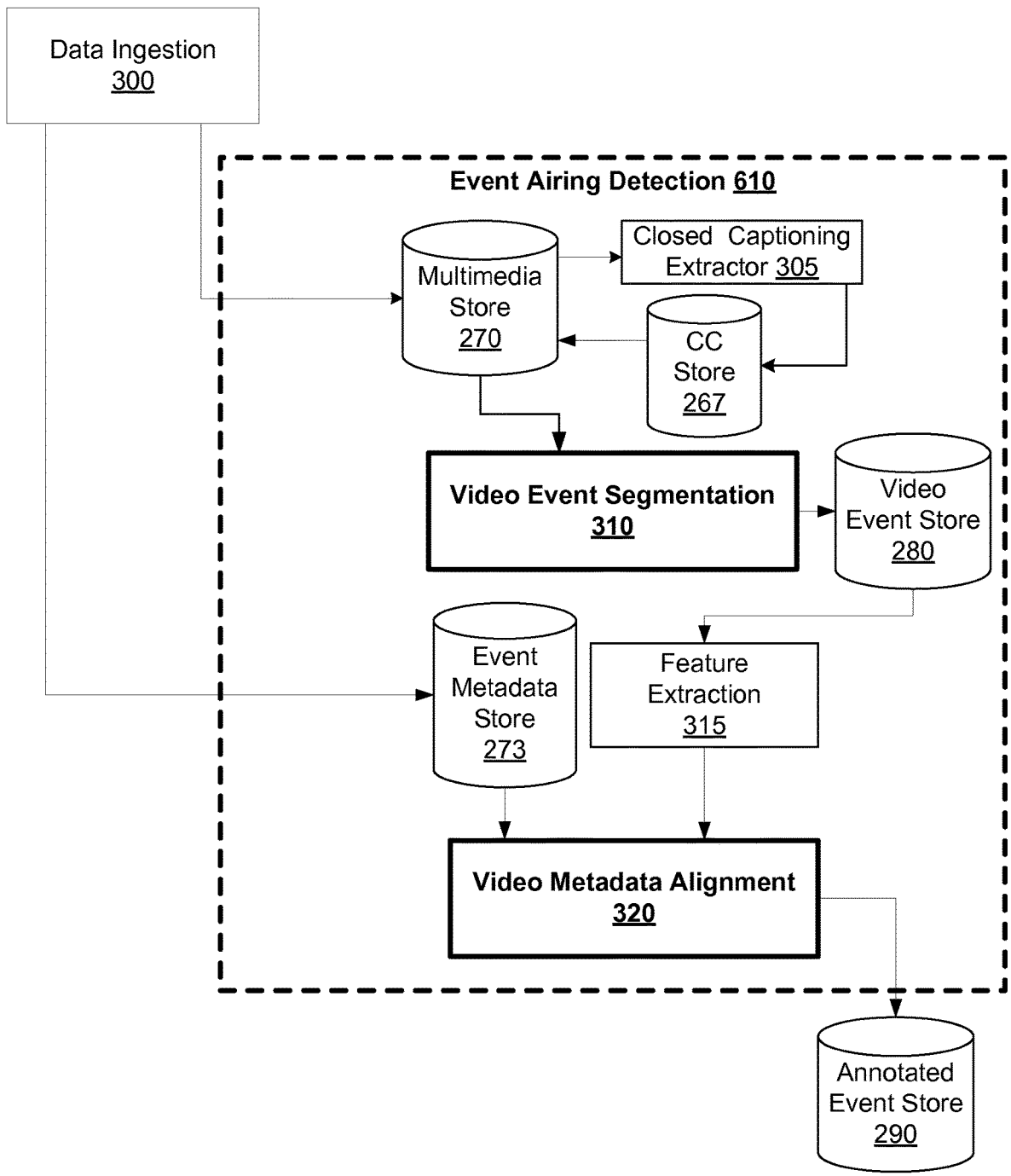
FIG. 3A is a flow diagram illustrating one embodiment of a method for determining the airings of time-based media events.

FIG. 3A is a flow diagram illustrating one embodiment of a method for determining the airings of time-based media events.

As a preliminary step in the method, multiple streams of data are ingested 300 at the system 130 for processing. Data may be received at the system 130 directly from content providers, or from social networking systems 110 or time-based media sources 120, e.g., from broadcast television feeds, radio feeds, internet streams, directly from content producers, and/or from other third parties. In one embodiment, web server 200 is one means for ingesting 300 the data. The types of data may include, but are not limited to, time-based media, electronic programming guide data 605 metadata, closed captioning data, statistics, social media posts, mainstream news media, and usage statistics, such as described above.

The ingested data is stored in data stores specific to one or more data types that serve as the input data sources for the primary processes of the method of FIG. 3A (each shown in bold). For example, time-based media data is stored in the multimedia store 270. The time-based media in the multimedia store 270 may undergo additional processing before being used within the methods shown in FIGS. 3-6. For example, closed captioning data can be extracted from 305 the time-based media, e.g., by closed captioning extractor 305. In addition, event metadata associated with multimedia is stored in the event metadata store 273, and social media information in the received social media information store 260.

As a result of the ingestion referenced above, the multimedia store 270 includes various forms of time-based media. The time-based media may be of various types, as described in conjunction with FIG. 2.

The process for detecting the airings of various time based media events may be described as including two major processes: video event segmentation 310 and video metadata alignment 320. Each of these processes 310-320 are described below. The process of FIG. 3A may be referred to as an event airing detection process 610.

Video Event Segmentation

The first process is video event segmentation 310, in which the time-based media is segmented into semantically meaningful segments corresponding to discrete events depicted in video at semantically meaningful boundaries. The input to the video event segmentation 310 process is a raw video (and/or audio) stream that is retrieved from the multimedia store 270 according to one embodiment, and may be performed, e.g., by the event segmentation engine 220.

The video event segmentation 310 process includes three main components according to one embodiment: shot boundary detection, event detection, and boundary determination. These components may vary by domain. For example, for sporting events an additional component may correspond to scene classification (e.g., field or stadium identification).

The output of video event segmentation 310 is a set of segmented video events that are stored in the video event store 280. Video event segmentation 310 is described in further detail in conjunction with FIG. 4.

Video Metadata Alignment

The next process is video metadata alignment 320, in which the segments from video event segmentation 310 are annotated with semantically meaningful information regarding the event that the segment is relevant to, or depicts. Input to video metadata alignment 320 is a video event retrieved from the video event store 280 and metadata from the event metadata store 273. Such metadata can include, but is not limited to: the type of event occurring, the brand/product for which an advertisement event is advertising, the agents actors/characters involved in the event, the scene/location of the event, the time length of the event, the results/causes of the event, etc. For example, metadata for an advertisement event may include information such as "Brand: Walmart, Scene: father dresses up as clown, Mood: comic." As illustrated in these examples, the metadata can be structured as tuples of <name, value> pairs.

The metadata includes text and lower level image and audio properties. Metadata may be generated using human annotation (e.g., via human annotators watching events or samples thereof) and may be supplemented with automatic annotations for use in the alignment process (e.g., describing lower level image and audio properties of the event such as number and length of each shot, average color histograms of each shot, power levels of the associated audio, etc.) The annotation is stored in the annotated event store 290.

Video metadata alignment 320 includes two steps according to one embodiment: event feature extraction and video metadata alignment. Video metadata alignment 320 is described in further detail in conjunction with FIG. 5.

According to another embodiment, data ingestion 300, video event segmentation 310, and video metadata alignment 320 (or, collectively, event airing detection 610) could be performed by a separate entity, such as a content provider or owner, e.g., which does not want to release the video content to others. In this embodiment, the targeted messaging provider 130 would provide software, including the software modules and engines described herein, to the separate entity to allow them to perform these processes on the raw time-based media. The separate entity in return could provide the system 130 with the extracted features, video events, and their respective metadata for use by the system 130. These data exchanges could take place via API 202 exposed to the separate entity via web server 200.

Video Event Segmentation

Figure 4:
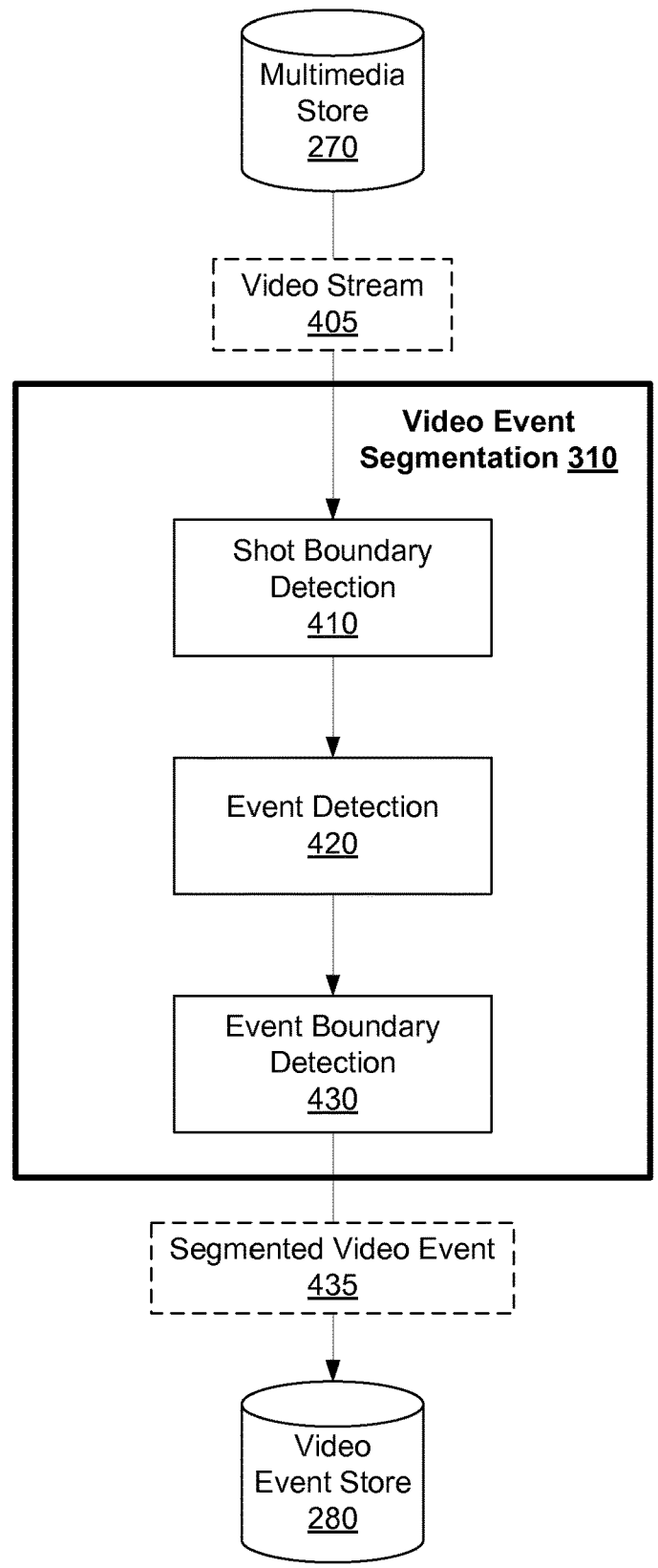
FIG. 4 is a flow diagram illustrating one embodiment of a video event segmentation process.

FIG. 4 is a flow diagram illustrating one embodiment of a video event segmentation process 310. As described in FIG. 3A, video event segmentation 310 segments time-based media into semantically meaningful segments corresponding to discrete portions or "events," e.g., via event segmentation engine 220, which is one means for performing this function.

Input to the video event segmentation process 310 is a video stream 405 from the multimedia store 270. Video event segmentation 310 includes 3 phases: shot boundary detection 410, event detection 420, and event boundary determination 430, each of which is described in greater detail below. The output of video event segmentation 310 is a segmented video event 435, which is stored in the video event store 280.

Shot Boundary Detection

The first step in segmenting is shot boundary detection 410 for discrete segments (or "shots") within a video. Shot boundaries are points of non-continuity in the video, e.g., associated with a change in a camera angle or scene. Shot boundaries may be determined by comparing color histograms of adjacent video frames and applying a threshold to that difference. Shot boundaries may be determined to exist wherever the difference in the color histograms of adjacent frames exceeds this threshold. Many techniques are known in the art for shot boundary detection. One exemplary algorithm is described in Tardini et al., *Shot Detection and Motion Analysis for Automatic MPEG-7 Annotation of Sports Videos,* 13th International Conference on Image Analysis and Processing (Nov. 2005). Other techniques for shot boundary detection 410 may be used as well, such as using motion features. Another known technique is described in A. Jacobs, et al., *Automatic shot boundary detection combining color, edge, and motion features of adjacent frames*, Center for Computing Technologies, Bremen, Germany (2004).

Event Detection

Event detection 420 identifies the presence of an event in a stream of (one or more) segments using various features corresponding, for example, to the image, audio, and/or camera motion for a given segment. A classifier using such features may be optimized by hand or trained using machine learning techniques such as those implemented in the WEKA machine learning package described in Witten, I. and Frank, E., *Data Mining: Practical machine learning tools and techniques* (2nd Edition), Morgan Kaufmann, San Francisco, Calif. (June 2005). The event detection process 420 details may vary by domain.

Image features are features generated from individual frames within a video. They include low level and higher level features based on those pixel values. Image features include, but are not limited to, color distributions, texture measurements, entropy, motion, detection of lines, detection of faces, presence of all black frames, graphics detection, aspect ratio, and shot boundaries.

Speech and audio features describe information extracted from the audio and closed captioning streams. Audio features are based on the presence of music, cheering, excited speech, silence, detection of volume change, presence/absence of closed captioning, etc. According to one embodiment, these features are detected using boosted decision trees. Classification operates on a sequence of overlapping frames (e.g., 30 ms overlap) extracted from the audio stream. For each frame, a feature vector is computed using Mel-frequency cepstral coefficients (MFCCs), as well as energy, the number of zero crossings, spectral entropy, and relative power between different frequency bands. The classifier is applied to each frame, producing a sequence of class labels. These labels are then smoothed using a dynamic programming cost minimization algorithm, similar to those used in hidden Markov models.

In addition to audio features, features may be extracted from the words or phrases spoken by narrators and/or announcers. From a domain specific ontology (not shown), a predetermined list of words and phrases is selected and the speech stream is monitored for the utterance of such terms. A feature vector representation is created in which the value of each element represents the number of times a specific word from the list was uttered. The presence of such terms in the feature vector correlates with the occurrence of an event associated with the predetermined list of words. For example, the uttering of the phrase "Travelocity" is correlated with the occurrence of an advertisement for Travelocity.

Unlike image and audio features, camera motion features represent more precise information about the actions occurring in a video. The camera acts as a stand in for a viewer's focus. As actions occur in a video, the camera moves to follow it; this camera motion thus mirrors the actions themselves, providing informative features for event identification. Like shot boundary detection, there are various methods for detecting the motion of the camera in a video (i.e., the amount it pans left to right, tilts up and down, and zooms in and out). One exemplary system is described in Bouthemy, P., et al., *A unified approach to shot change detection and camera motion characterization*, IEEE Trans. on Circuits and Systems for Video Technology, 9(7) (October 1999); this system computes the camera motion using the parameters of a two-dimensional affine model to fit every pair of sequential frames in a video. According to one embodiment, a 15-state first-order hidden Markov model is used, implemented with the Graphical Modeling Toolkit, and then the output of the Bouthemy is output into a stream of clustered characteristic camera motions (e.g., state 12 clusters together motions of zooming in fast while panning slightly left).

Event Boundary Determination

Once a segment of video is determined to contain the occurrence of an event, the beginning and ending boundaries of that event must be determined 430. In some cases, the shot boundaries determined in 410 are estimates of the beginning and end of an event. The estimates can be improved as well by exploiting additional features of the video and audio streams to further refine the boundaries of video segments. Event boundary determination 430 may be performed using a classifier that may be optimized by hand or using supervised learning techniques. The classifier may make decisions based on a set of rules applied to a feature vector representation of the data. The features used to represent video overlap with those used in the previous processes. Events have beginning and end points (or offsets), and those boundaries may be determined based on the presence/absence of black frames, shot boundaries, aspect ratio changes, etc., and have a confidence measure associated with the segmentation. The result of event boundary determination 430 (concluding video event segmentation 410) is a (set of) segmented video event 435 that is stored in the video event store 280.

Video Metadata Alignment

Figure 5:
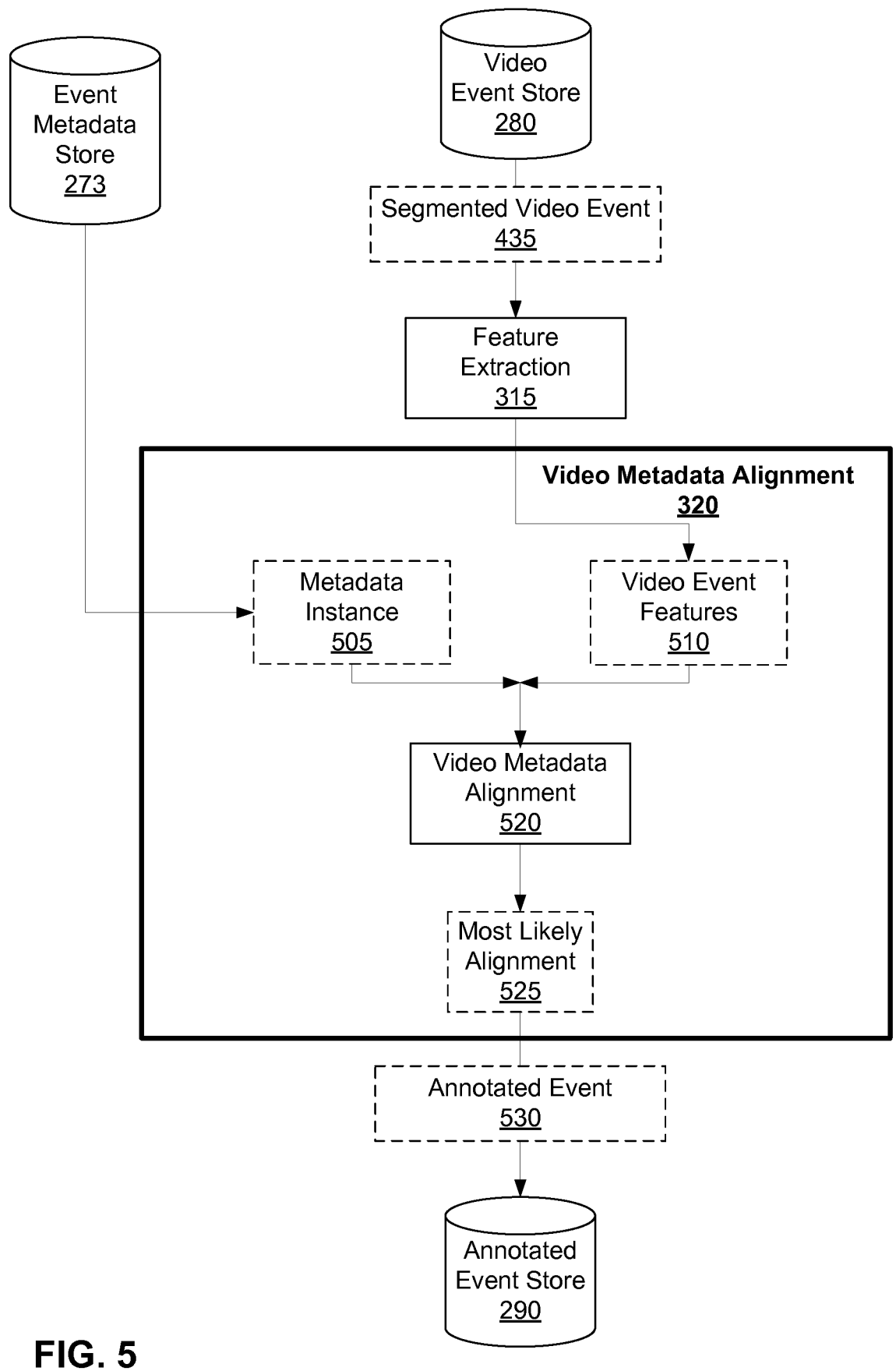
FIG. 5 is a flow diagram illustrating one embodiment of a video metadata alignment process.

FIG. 5 is a flow diagram illustrating one embodiment of a video metadata alignment 320 process. As described in FIG. 3A, the video metadata alignment 320 process produces annotations of the segments from video event segmentation 310, which annotations include semantically meaningful information regarding the event or topic that the segment is about. Video metadata alignment 320 includes two steps: feature extraction 315 and video metadata alignment 520.

Video Feature Extraction

For any given video event that is to be aligned with metadata, the first step is to convert the video event into a feature vector representation via feature extraction 315. The feature extraction engine 315 is one means for performing this function. Input to the process is a segmented video event 435 retrieved from the video event store 280. Output from the video feature extraction 315 is a video event feature representation 510. The features may be identical to (or a subset of) the image/audio properties discussed above for video events and stored in the event metadata store 273, and may vary by domain.

Video Metadata Alignment

Video metadata alignment 520 takes as input the video feature vector representation 510 of a video event and a metadata instance 505, defined above as metadata corresponding to a single event. The video metadata alignment engine 320 is one means for performing this function. It cycles through each metadata instance 505 in the event metadata store 273 and uses an alignment function to estimate the likelihood that a particular event may be described by a particular metadata instance for an event. As described above, metadata instances include automatic annotations of low level content features (e.g., image or audio features) and hand annotations of text descriptions. The alignment function may be a simple cosign similarity function that compares the feature representation 510 of the event to the low level properties described in the metadata instance 505.

When all metadata instances 505 in the event metadata store 273 corresponding to the event have been examined, if the most likely alignment 525 (i.e., alignment with the highest probability or score) passes a threshold, the video event associated with the feature representation 510 is annotated with the metadata instance 505 and the resulting annotated event 530 is stored in an annotated event store 290 along with a score describing the confidence of the annotation. If no event passes the threshold, the event is marked as not annotated. In order to set this threshold, a set of results from the process is hand annotated into two categories: correct and incorrect results. Cross-validation may then be used to find the threshold that maximizes the precision/recall of the system over the manually annotated result set.

Example: Advertising

As described in conjunction with FIG. 3A, multiples streams of data are ingested as a preliminary step in the method.

Video Event Segmentation

For the advertising domain, during the video event segmentation 310 process, the time-based media is segmented into semantically meaningful segments corresponding to discrete "events" which are identified with advertisements (i.e. commercials).

Event detection 420 in the advertising domain may operate by identifying one or more shots that may be part of an advertisement. Advertisements can be detected using image features such as the presence of all black frames, graphics detection (e.g. presence of a channel logo in the frame), aspect ratio, shot boundaries, etc. Speech/audio features may be used including detection of volume change, and the presence/absence of closed captioning.

Event boundary detection 430 operates on an advertisement block and identifies the beginning and ending boundaries of individual ads within the block. Event boundary determination may be performed using a classifier based on features such as the presence/absence of black frames, shot boundaries, aspect ratio changes, typical/expected length of advertisements. Classifiers may be optimized by hand or using machine learning techniques.

Video Metadata Alignment

As with event segmentation 310, the video metadata alignment 320 process is domain dependent. In the advertisement domain, metadata for an advertisement may include information such as "Brand: Walmart, Scene: father dresses up as clown, Mood: comic." This metadata is generated by human annotators who watch sample ad events and log metadata for ads, including, the key products/brands involved in the ad, the mood of the ad, the story/creative aspects of the ad, the actors/celebrities in the ad, etc.

Metadata for advertisements may also include low level image and audio properties of the ad (e.g. number and length of shots, average color histograms of each shot, power levels of the audio, etc.).

For each event (i.e., advertisement) that is to be aligned with metadata, the advertisement is converted into a feature vector representation via feature extraction 315. Video metadata alignment 520 then takes as input the feature vector representation 510 of an advertisement and a metadata instance 505. It cycles through each metadata instance 505 in the event metadata store 273 and estimates the likelihood that the particular advertisement may be described by a particular metadata instance using, for example, a simple cosign similarity function that compares the low level feature representation of the ad event to the low level properties in the metadata.

The particular start and end times, channel and location in which the specific advertisement appeared is included with the metadata that is stored in the Annotated Event Store 290.

Social Networking System Targeted Message Synchronization

As advertisers use the audience demographics of TV shows to select TV shows in which to show advertisements, SNS targeted message synchronization allows advertisers to leverage their investments in advertisements with messaging to SNS users who are most likely to be in a particular demographic of interest to the advertiser, and/or who are most likely to have already viewed their advertisements.

Figure 6:
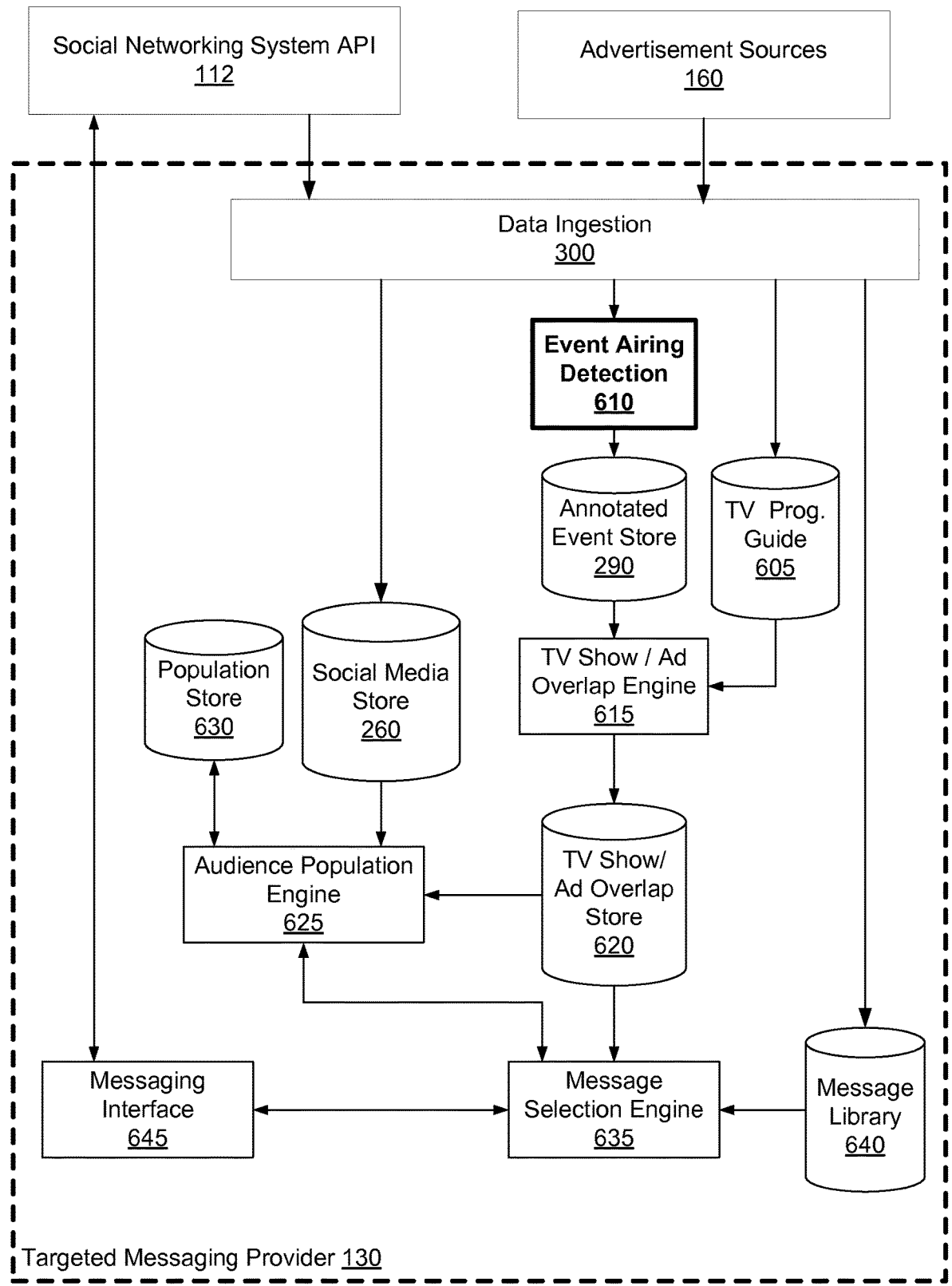
FIG. 6 is a flow diagram illustrating one embodiment of social networking system targeted message synchronization.

FIG. 6 is a flow diagram illustrating one embodiment of a method for social networking system (SNS) targeted message synchronization. In this embodiment, SNS targeted message synchronization sends messages to users of SNSs who reference social media content (or are referenced in or associated with social media content items) that also reference content items related to TV shows or advertisements. The SNS targeted message synchronization process leverages the assumption that a SNS user who refers to a TV show or advertisement in a social media content item is likely to have been exposed to the advertisements that are aired during that TV show or near in time to that advertisement. SNS targeted messaging synchronization thus sends messages to users based on the advertisements they are likely to have already been exposed to.

In one embodiment of a SNS targeted message synchronization process, the data ingest process 300 accesses data from a number of different data feeds including video streams and TV electronic programming guide data ("EPG data"). Data ingestion 300 receives the TV streams from network broadcast, cable, internet, satellite providers, video hosting services, or other sources of video content. The EPG data is stored in the TV programming guide 605 store as a set of mappings between metadata (e.g. TV show names, casts, characters, genres, episode descriptions, etc.) and specific airing information (e.g. time, time zone, channel, network, region, etc.). EPG data can be obtained from broadcast and cable networks, multiple system operators, or third party services.

The TV streams are processed using event airing detection 610 in order to identify airings of specific advertisements and TV shows in the TV streams. The output of event airing detection 610 is stored in the annotated event store 290 as a set of mappings between video events (e.g., advertisements) and metadata annotations (e.g., showing time, channel, brand, keywords, etc.) associated with those video events. Event airing detection 610 is described generally above with respect to FIG. 3A. Event airing detection 610 incorporates video event segmentation 310, which is described in FIG. 4, as well as video metadata alignment/annotation 320, which is described in FIG. 5. A specific example of event airing detection 610 is described above under the heading "Example: Advertising".

The TV show/ad overlap engine 615 accesses the annotated video events 290 and the EPG data 605 to create mappings between the detected airings of advertisements and the TV shows in which those airings occurred, that is, to determine which advertisements aired during which TV shows. The matching may include, for example, comparing the temporal extent of the airing times of the TV shows and advertisements. If an advertisement airs between the total temporal extent of the TV show, the airing advertisement is determined to match (or overlap) the airing of the TV show. When an airing of an advertisement occurs on the same channel, in the same TV market, and within the same airing time window as a TV show, a mapping indicative of this occurrence is stored in the TV show/ad overlap store 620 by the TV show/ad overlap engine 615. For example, a mapping may be created between an ad for laundry detergent airing at 7:15 pm PST on FOX™ on Comcast™ cable and an episode of the TV show Glee from 7:00 pm to 8:00 pm PST, also on FOX™ on Comcast™ cable.

In addition to ingesting video streams and related metadata, the data ingest process 300 also accesses social media information from the SNSs that the system 130 is configured to provide with targeted messaging. In one embodiment, the social media information is accessed by the system 130 using a SNS API 112. The accessed social media information includes a number of social media content items, that are stored in the social media store 260.

Social media content items may include any object or data storage unit from the SNS. Social media content items generally contain content created or added by the user who authors the item, along with one or more references to other social media content items. Generally, each item will include at least a reference to the content item signifying the authoring user (e.g., the authoring user's profile in the SNS), however other users (e.g., friends of the user) or objects (e.g., the content item associated with a TV show) may also be referenced in a content item. Thus, a given user may be said to be "referenced in" a social content item by either being its author, or by being identified in, linked to, or a recipient of, a social content item.

One example of a general type of social media content item includes content items related to specific real world entities. For example, social media content items may be created for individual users (e.g., user profiles), or for organizations, events, TV shows, advertising campaigns, and the like. Each of these content items may include its own content (e.g., the name of the user and the user's demographic information) and references to other content items (e.g., connections to the user's interests and to the user's friends).

Another example of a general type of social media content item include posts by users regarding other social media content items already in existence in the SNS. Examples of these types of content items include posts referencing a specific content item (e.g., a TV show content item), indications of affinity (e.g., "likes" or "+1s") by users for other content items, and links to outside internet content (e.g., to the FOX™ website for Glee).

As an example of a content item, a first user ("User A") may have authored a comment directed to another recipient user ("User B") of the SNS, stating "Did you see the new Glee episode last night?" This example content item may include a reference between the content item and the content item associated with the TV show Glee. Thus, both users, User A and User B, as well as the TV show Glee, are referenced in this social content item. This example content item may also include a reference between the content items associated with User B and with the TV show Glee, and a reference between the example content item itself, and the content items of both User A and User B.

References between content items may be visible or invisible to users of the SNS. Two examples of a visible reference may be, for example, if a content item contains a hypertext link to the content items of the recipient user and the TV show. For example, in the content item "Carl, did you see the new Glee episode last night?", the underlined "Carl" "Glee" may each be clickable references such that when a user clicks on either "Carl" or "Glee", the web browser is redirected to the web page associated with the clicked content item. Alternatively, references may be invisible to users. For example, if a first user posts the content item "Did you see the new Glee episode last night?" on a second user's profile page, the posted content item may contain references to the first user, second user, and Glee, even though the references are not visible to the users.

A reference between a content item associated with a user and a content item with another object (e.g., a television show) generally indicates an affinity by the user for the content item. For example, if a first user authors a content item to a second user saying "I loved last night's episode of Glee," it can be inferred that both the first and second users have an affinity for Glee. For content items associated with TV shows, it is assumed that if a user is referenced in connection with the TV show's content item, then there is a high likelihood that the user has been exposed to advertisements that air during that TV show. The system 130 uses this assumption to determine which messages to send to which users.

The audience population engine 625 determines which populations of users are designated to receive which targeted messages. The creation of a population of users may be triggered in response to a request from the message selection engine 635, or in response to the airing of a particular TV show or advertisement. The audience population engine 625 uses both references between content items of SNS users and specific TV shows, as well as airing overlap information between those specific TV shows and the advertisements that air during those TV shows to output a mapping of SNS users and advertisements. The mapping created by the audience population engine 625 lists advertisements that SNS users who are referenced in connection with specific TV show are likely to have seen, and is stored in the population store 630. For a given user, the population store 630 may list mappings to all advertisements they are likely to have seen. For a given advertisement, the population store 630 may list mappings to all users who are likely to have seen that advertisement.

In addition to mapping individual users of the SNS to advertisements they are likely to have seen, the audience population engine 625 is also configured to form populations of authors who may have seen a given TV show or advertisement. The audience population engine 625 creates populations of authors by filtering from the list of SNS users who are mapped to a given advertisement (e.g., by filtering from the list of users who are likely to have seen the given advertisement). These populations may be further filtered based on demographic criteria, content criteria, temporal criteria, or any number of other criteria. The users that make up each population may overlap. Populations generated by the audience population engine 625 are stored in the population store 630.

Demographic criteria for creating a population includes, for example, selecting SNS users based on age, gender, socioeconomic data, genre interests, hobbies, groups, networks, affiliations, and/or location. This information may be drawn from the content items associated with or referencing the user in the SNS and stored in the social media store 260. For example, it may be specified that a particular advertisement is only to be sent to user ages 18-29.

Content criteria for determining a population includes selecting SNS users based on whether the content items referencing those users match one or more content filters. Content filters may be, for example, be particular keywords or phrases. For example, the filter may be set to include users who author content items that contain the name "Jane," as in comment containing the statement: "Did you see Jane's outfit!" Filters may also be set to include users who mention particular products or items. For example, filters may include users who use the words "outfit" or "dress" or "wearing", such as "I love what Brenda was wearing!" Filters may also be set to include users based on their sentiment towards products, in order to, for example, only target users who express positive sentiment toward those products. For example, a filter may be set to include users referring to a "dress" in positive contexts only, such as "I love that dress," and not users who use them in negative contexts, such as "I hate that dress."

Temporal criteria for determining a population includes selecting SNS users who are referenced in content items created (e.g., a comment being posted) within a certain period of time (e.g., 60 seconds) before or after an advertisement or TV show is aired. Temporal criteria may also be used to remove users from a population who have recently (e.g., within the last hour) received a message from the system 130, either from the same advertiser or from any advertiser.

Once created, populations may later be refined or generalized from the original population by adjusting the criteria used to create the population. The ability to tailor the populations of SNS users facilitates use of the system 130 by advertisers or third parties who wish to narrow or widen the scope of their targeted messaging activities. For example, instead of targeting all users who have commented on a particular episode of Glee, a population could be broadened to include all users who have ever commented on any episode Glee. The reasoning behind targeting the more general population of Glee viewers for messaging is that users who are engaged enough to comment on a particular episode of a TV show are likely to be watching that show on future occasions, even if they are not referenced in a content item for a particular episode.

Message library 640 is a data store that stores messages to be sent to SNS users. Messages sent to SNS users include advertisements, brands, advertising creatives, as well as triggering messages. Triggering messages are messages that are sent to the SNS 110 to inform the SNS that another message (e.g., a specific advertisement) should be forwarded to one or more SNS users. Triggering messages allow the targeted messaging provider 130 to direct advertisements to SNS users without having to directly storing the advertising content. Message library 640 also stores messages metadata associated with each message. Message metadata may include advertiser, geographic or usage restrictions, and message sequencing information. Message library 640 also stores rules for when and to whom messages are to be sent. The content of a message may include offers, incentives, and product information. For example, a message may take the form of a hyperlink stating "Click here for an additional 10% off jeans already on sale at Old Navy™" along with an underlying URL to an ecommerce site where the user can purchase this product. Message library 640 receives messages to send and rules for sending them from advertisement sources 160 through data ingestion 300.

Rules for messages may take the form of a mapping between a combination of any one of a particular advertisement or a particular TV show as rule antecedents, and rule consequents including a particular message to be sent, a particular targeted population of authors, and a particular time the message is to be sent. For example, a rule may embody the logic of "If advertisement X airs during show Y, then send message N to the Population M." As some advertisers show the same advertisement multiple times during a TV show, the rules can also more precisely identify a time (or time window) at which an advertisement aired, the number of messages to be sent in response to the advertisement, or the advertisement's sequence position (e.g., first appearance, second appearance, etc.). Sequence position is useful where the advertiser does not know in advance exactly when its advertisements may appear, and to overcome variations in program scheduling.

As described above, the population of users who receive a message can be changed by adjusting the population criteria. The population of users receiving a message can be changed by implementing rule antecedents or rule consequents that filter populations of users receiving a message.

Rules may also specify when a message is to be sent. For example, a rule may specify that a message is to be sent while the advertisement is airing, within a specific time period after the advertisement airs, the next time the recipient user logs into the SNS, the next time the user authors a content item on the relevant TV show or advertisement, or that the message may be sent at anytime in the future.

Message selection engine 635 determines which messages to send to SNS users. The sending of a message to a SNS may be triggered either on the message selection engine's 635 own initiative, or in response to a request by a SNS.

To send a message on its own initiative, the message selection engine 635 is configured to keeps track of the TV shows and advertisements that are currently airing or have aired. The message selection engine 635 may do this by monitoring information from the TV show/ad overlap store 620, and/or from the TV programming guide 605. When advertisements or TV shows are detected as having aired, the message selection engine 635 queries the message library 640 for rules wherein the detected advertisements or TV shows are used in rule antecedents.

If such a rule is matched, the message selection engine 635 identifies a message associated with the matched rule, as well as a population of SNS who are to be messaged according to the matched rule. If more than one rule is matched, then the message selection engine 635 may selects between the possible matched rules. The selection may, for example, be based on how recently the user is expected to have seen the ad, the amount of time since a user or population received a message, and/or how much an advertiser associated with a rule and message paid or bid for the advertising space for that message, The message selection engine 635 may also be configured to instruct that a message be sent within a particular time period (e.g., within 5 minutes after a detected TV show or ad airs). The time period may be specified by the advertiser as part of the message metadata as stored in the message library 640. For example, an advertiser may specify that message must be delivered within 30 seconds of the advertisement airing. Alternatively, the advertiser may specify that that a sequence of messages is be transmitted over a designated time period.

Alternatively, if a request for a message is received from the SNS, the message selection engine 635 determines what message to send based on the received request. The received request may specify an individual user, or a population of users defined according to one or more criteria.

In the case of a request for a message for a specific user, the message selection engine 635 may query the audience population engine 625 for the list of advertisements the user is likely to have seen. The message selection engine 625 then queries the message library 640 for rules associated with the listed advertisements. If such a rule is matched, the message selection engine 635 identifies a message associated with the matched rule to be sent to the user.

In the case of a request for a message for a population of users, the message selection engine 635 may query the audience population engine 625 for a population of users and the advertisements they are likely to have seen based on the received criteria. The message selection engine 625 then queries the message library 640 for rules associated with the listed advertisements. If such a rule is matched, the message selection engine 635 identifies a message associated with the matched rule to be sent to the user.

A messaging interface 645 communicates messages to SNS users. The messaging interface 645 communicates with the SNS through an API 112 made available by the SNS. The messaging interface 645 is also configured to receive requests from the SNS for messages. In one embodiment, requests received for messages by the SNS are the result of the system 130 or a third party (not shown) bidding for the right to present advertisements to users or populations of users within the SNS. The bidding system may be implemented in the messaging interface 645 or in another part of the system (not shown).

Figure 7:
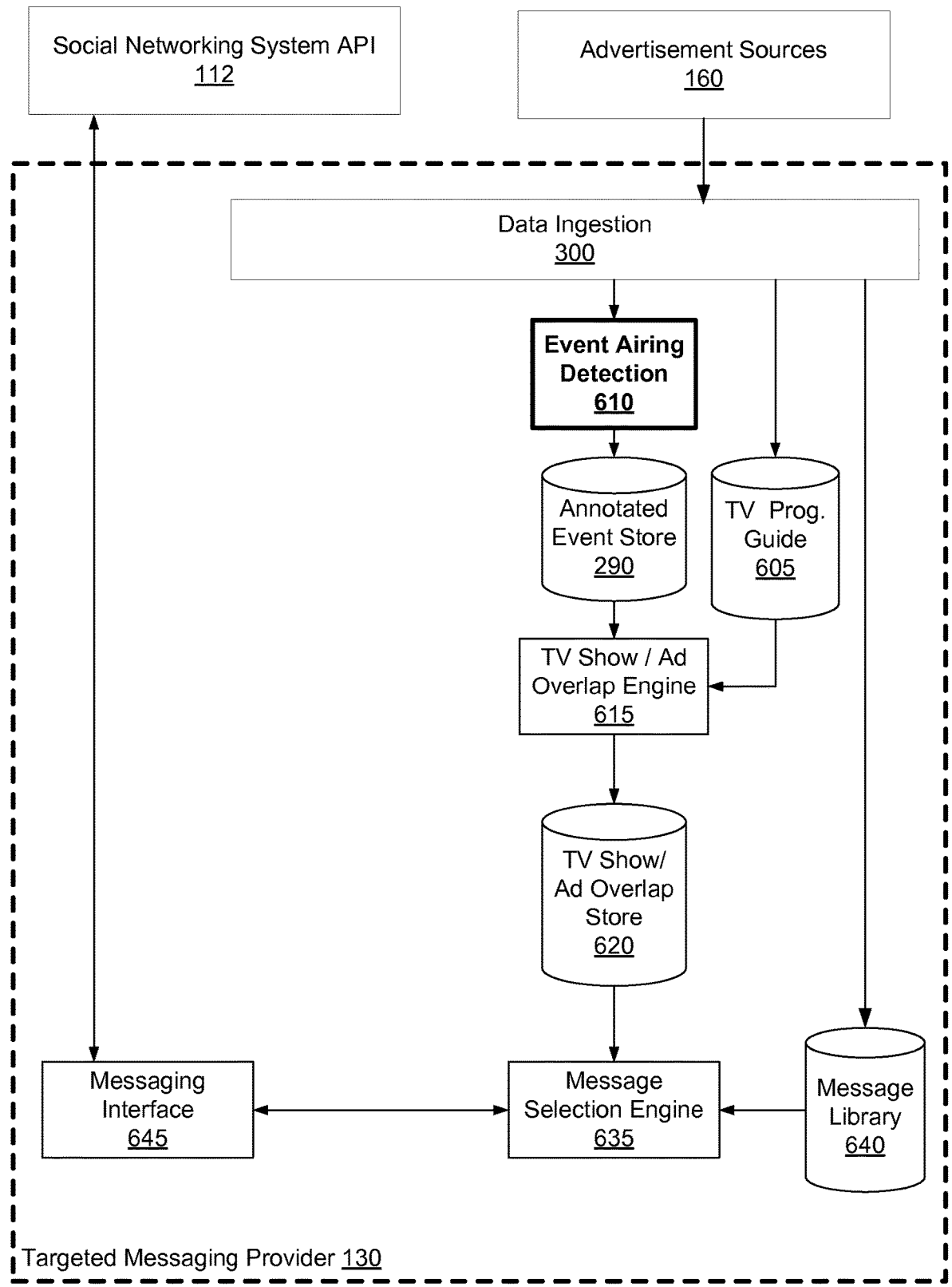
FIG. 7 is a flow diagram illustrating one embodiment of a method for social networking system (SNS) targeted message synchronization.

FIG. 7 is a flow diagram illustrating one embodiment of a method for social networking system (SNS) targeted message synchronization. In this embodiment, SNS targeted message synchronization sends messages to users of SNSs who meet targeting criteria specified by advertisers. As above, the SNS targeted message synchronization process leverages the assumption that a SNS user who refers to a TV show or advertisement in a social media content item is likely to have been exposed to the advertisements that are aired during that TV show or near in time to that advertisement. However, in this case the SNS 110, rather than the targeted messaging provider 130, determines specifically which users will receive a message from an advertiser. Instead, the targeted messaging provider 130 sends the SNS 110 messages along with targeting criteria that the SNS 110 uses to determine which users receive a message.

The process of FIG. 7 is similar to the process described in FIG. 6 with respect to data ingest 300, event airing detection 610, the annotated event store 290, the TV programming guide 605, the TV show/ad overlap engine 615, and the TV Show/Ad Overlap Store 620. One difference is that in this case, data ingestion 300 does not receive information from the social networking system regarding individual users. As a consequence, in this embodiment populations of users who are likely to have seen an ad are not created by the targeted messaging provider 130, and may instead be created by the SNS, depending upon the implementation of the SNS.

As above, message selection engine 635 determines which messages to send to SNS users. The sending of a message to the SNS may be triggered either on the message selection engine's 635 own initiative, or in response to a request by the SNS. To send messages on its own initiative, the message selection engine 635 may send messages responsive to the airing of an advertisement, responsive to a rule in the message library 640 being matched, or according to a schedule, for example as part of a feed to the SNS. The SNS may also request messages, either individually, in batches, or as part of a feed.

The message selection engine 635 queries the message library for rules that match aired, detected advertisements. If such a rule is matched, the message selection engine 635 identifies a message associated with the matched rule, as well as one or more targeting criteria to be sent along with the message. This is in contrast to the example of FIG. 6, where populations were instead used as a determining factor in who received a message.

In one embodiment, the request for messages received from the SNS may include additional rule criteria that must be matched in addition to any criteria otherwise included in a rule. In this way, SNSs 110 can exert their own preferences over which messages they receive from the targeted messaging provider 130.

The message and targeting criteria are sent to the SNS 110 by the messaging interface 645. The targeting criteria sent along with the message informs the SNS 110 of which users are specified to receive the message. The targeting criteria is stored in the message library 640 along with messages and their associated rules. Upon receipt of a message and targeting criteria, the SNS 110 is tasked with analyzing the targeting criteria and determining which specific users receive the message. The targeting criteria may, for example, include demographic information (e.g., age, gender), expected interests of recipient users, habits or activity of recipient users, influence of users on other SNS users (e.g., number of friends, how often they log in to the SNS, how often they author posts in the SNS, how recently since their last log in), information regarding the television show or radio program or other time-based media event the message is associated with, the time of occurrence of an airing of a time-based event associated with the message, and other factors.

The targeting criteria may also specify the manner in which the message is to be delivered. For example, the targeting criteria may specify the number of messages to be delivered to each user (e.g., one, a sequence of three), the advertisement creative the message is associated with, and the time the message is to be delivered (e.g., within 5 minutes after a detected ad airs). As described above, this may also include considerations of how recently the user is expected to have seen the ad, the amount of time since a user or group of users have received a message, In one embodiment, messages may be sent from the targeted messaging provider 130 to the SNS 110 without any targeting criteria. In this case, the SNS 110 chooses how to distribute messages amongst its members.

Example: Old Navy™ Targeted Messaging

Old Navy™ is a retail clothing company who advertises on TV and who may want to offer coupons to certain users. Conventionally, Old Navy™ could use a direct mail marketing campaign to send coupons to individuals selected from qualified mailing lists (such as prior purchasers of their products), or simply allow users to download coupons from a website. Neither of these approaches directly leverage the advertising expenditures that the company has made for TV advertisements.

In one embodiment, Old Navy™ can send coupons as targeted messages directly to SNS users who are connected, in the SNS, to TV shows in which Old Navy's advertisements appear. These messages may be targeted in the sense their content may be tailored based on both Old Navy's advertising creative campaign and also based on the TV show in which the creative is airing. The targeted messages may include coupons offering discounts to the users if they click on a URL contained in the message.

In one embodiment, one or more TV streams is monitored for airings of specific Old Navy™ advertisements. At some point during one of the TV streams, an Old Navy™ commercial advertising a sale on jeans is detected using event airing detection 610. The TV show/ad overlap engine 615 uses the current time and stream information (e.g., channel, media market) to determine which TV show was being aired on that stream when the advertisement aired. For example, it may be determined that the Old Navy™ advertisement was aired during a particular episode of the show Glee on channel 10 starting at 8 pm.

Having detected this occurrence of the Old Navy™ advertisement, and on its own initiative or responsive to a request from the SNS, the message selection engine 635 determines if there is a rule pertaining to the Old Navy™ advertisement in the message library 640. If a rule matches the airing of the advertisement, one or more messages are sent from the messaging interface 745 to the SNS. The SNS will determine which users receive which message based on the rule and the targeting criteria. The message may also be sent to particular users of the SNS based on references between those users and Glee or Old Navy in social media content items received from the SNS, as well based on the rule and the targeting criteria. The message may, for example, be: "Click here for an additional 10% off jeans already on sale at Old Navy™."

Messages may also be more specifically targeted to the TV show in which the ad aired. For example, when an Old Navy™ ad airs during Glee, the following message may be sent to each user in the target population: "Glee fans: click here for a Glee trivia quiz. You could win an additional 10% off jeans already on sale at Old Navy™." In another example, when an Old Navy™ advertisement airs during the TV show Glee, the following message may be sent to users who are classified as female, age 18-24: "Click here for an additional 10% off skirts already on sale at Old Navy™."

Additional Considerations

Although TV and advertising domains are described above, the methods described herein can be adapted to any domain using time-based media (e.g., radio). The method of adaptation is general across different domains. Techniques and features used for event segmentation and annotation are adapted to reflect domain specific characteristics. For example, detecting events in football exploits the visibility of grass as it is represented in the color distributions in a video frame, while detecting events in news video or audio clip may exploit clues in the closed captioning stream.

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules or engines, without loss of generality. The described operations and their associated modules or engines may be embodied in software, firmware, hardware, or any combinations thereof Any of the steps, operations, or processes described herein may be performed or implemented with one or more hardware or software modules or engines, alone or in combination with other devices. In one embodiment, a software module or engine is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be persistently stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the invention may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A method performed by a system of one or more computers, the method comprising:
    receiving, from a message promoter, one or more messages to be promoted to users of a social networking system;
    receiving, from the message promoter, one or more targeting criteria for promoting messages to the users of the social networking system;
    generating a population of users of the social networking system who are associated with an airing of a particular advertisement that was aired during a media event, including identifying users who published content items on the social networking system after a start of a broadcast of the media event and within a predetermined period of time after an end of the broadcast of the media event, the published content items each including a reference to another content item associated with the media event;
    classifying, based on the one or more targeting criteria, one or more users of the population of users as belonging to a matching subset of users for the one or more messages received from the message promoter; and
    sending the one or more messages on the social networking system to users in the matching subset of users.

2. The method of claim 1, further comprising:
    determining that the advertisement was aired during the media event; and
    sending the one or more messages in response to determining that the advertisement was aired during the media event.

3. The method of claim 1, further comprising:
    determining that a rule in a message library is matched; and
    sending the one or more messages in response to determining that the rule in the message library is matched.

4. The method of claim 1, wherein sending the one or more messages is performed according to a predetermined schedule.

5. The method of claim 1, wherein the one or more targeting criteria for the population of users associated with the airing of the particular advertisement comprises demographic information, expected interests of recipient users, habits or activity of recipient users, a measure of influence of users on other users, or a time of occurrence of an airing of a time-based event associated with the message.

6. The method of claim 1, wherein generating the population of users of the social networking system who are associated with an airing of a particular advertisement that was aired during a media event is performed by the social networking system.

7. A system comprising:
    one or more computers and one or more storage devices storing instructions that are operable, when executed by the one or more computers, to cause the one or more computers to perform operations comprising:
receiving, from a message promoter, one or more messages to be promoted to users of a social networking system;
receiving, from the message promoter, one or more targeting criteria for promoting messages to the users of the social networking system;
generating a population of users of the social networking system who are associated with an airing of a particular advertisement that was aired during a media event, including identifying users who published content items on the social networking system after a start of a broadcast of the media event and within a predetermined period of time after an end of the broadcast of the media event, the published content items each including a reference to another content item associated with the media event;
classifying, based on the one or more targeting criteria, one or more users of the population of users as belonging to a matching subset of users for the one or more messages received from the message promoter; and
sending the one or more messages on the social networking system to users in the matching subset of users.

8. The system of claim 7, wherein the operations further comprise:
determining that the advertisement was aired during the media event; and
sending the one or more messages in response to determining that the advertisement was aired during the media event.

9. The system of claim 7, wherein the operations further comprise:
determining that a rule in a message library is matched; and
sending the one or more messages in response to determining that the rule in the message library is matched.

10. The system of claim 7, wherein sending the one or more messages is performed according to a predetermined schedule.

11. The system of claim 7, wherein the one or more targeting criteria for the population of users associated with the airing of the particular advertisement comprises demographic information, expected interests of recipient users, habits or activity of recipient users, a measure of influence of users on other users, or a time of occurrence of an airing of a time-based event associated with the message.

12. The system of claim 7, wherein generating the population of users of the social networking system who are associated with an airing of a particular advertisement that was aired during a media event is performed by the social networking system.

13. One or more non-transitory computer storage media encoded with computer program instructions that when executed by one or more computers cause the one or more computers to perform operations comprising:
receiving, from a message promoter, one or more messages to be promoted to users of a social networking system;
receiving, from the message promoter, one or more targeting criteria for promoting messages to the users of the social networking system;
generating a population of users of the social networking system who are associated with an airing of a particular advertisement that was aired during a media event, including identifying users who published content items on the social networking system after a start of a broadcast of the media event and within a predetermined period of time after an end of the broadcast of the media event, the published content items each including a reference to another content item associated with the media event;
classifying, based on the one or more targeting criteria, one or more users of the population of users as belonging to a matching subset of users for the one or more messages received from the message promoter; and
sending the one or more messages on the social networking system to users in the matching subset of users.

14. The one or more computer storage media of claim 13, wherein the operations further comprise:
determining that the advertisement was aired during the media event; and
sending the one or more messages in response to determining that the advertisement was aired during the media event.

15. The one or more computer storage media of claim 13, wherein the operations further comprise:
determining that a rule in a message library is matched; and
sending the one or more messages in response to determining that the rule in the message library is matched.

16. The one or more computer storage media of claim 13, wherein sending the one or more messages is performed according to a predetermined schedule.

17. The one or more computer storage media of claim 13, wherein the one or more targeting criteria for the population of users associated with the airing of the particular advertisement comprises demographic information, expected interests of recipient users, habits or activity of recipient users, a measure of influence of users on other users, or a time of occurrence of an airing of a time-based event associated with the message.

18. The one or more computer storage media of claim 13, wherein generating the population of users of the social networking system who are associated with an airing of a particular advertisement that was aired during a media event is performed by the social networking system.

* * * * *